United States Patent [19]

Kwast

[11] 4,067,359
[45] Jan. 10, 1978

[54] RESET ASSEMBLY FOR SLAM-SHUT VALVES

[75] Inventor: Theodore Emil Kwast, Anaheim, Calif.

[73] Assignee: The Singer Company, New York, N.Y.

[21] Appl. No.: 692,163

[22] Filed: June 2, 1976

[51] Int. Cl.² ............................................. F16K 31/52
[52] U.S. Cl. .............................. 137/630.14; 137/461; 137/462; 137/463; 137/630.15
[58] Field of Search ........... 137/461, 462, 463, 630.14, 137/630.15; 251/73

[56] References Cited

U.S. PATENT DOCUMENTS

| 1,850,094 | 3/1932 | Dean ............................ 137/630.14 X |
| 2,557,378 | 6/1951 | Granberg ........................ 137/630.14 |
| 2,665,714 | 1/1954 | Greenwood ............................ 251/73 |
| 3,402,740 | 9/1968 | Perolo ............................ 137/630.14 |
| 3,422,841 | 1/1969 | Farrer ................................. 137/461 |

*Primary Examiner*—Harold W. Weakley
*Attorney, Agent, or Firm*—H. Weinstein; E. L. Bell; R. E. Smith

[57] ABSTRACT

A slam-shut valve or overpressure shutoff device used in series with, and upstream of, a pressure regulator to provide overpressure protection for apparatus downstream of the pressure regulator in the event of regulator failure. Overpressure or failure of the regulator automatically triggers operation of the slam-shut valve to close the same and prevent further passage of the gas through the pipeline. The slam-shut valve is normally in the open position, and the invention provides for manually resetting the slam-shut valve to reset it in the open position once it has been triggered closed.

The valve element is carried on a lever which is pivotally mounted on a reset shaft and spring-biased to close, but prevented from closing by the latch which releasably holds the lever in the open position. The reset shaft is turnable from an external fitting, but will not function until the shaft has been depressed to lock a bolt head in the correspondingly-shaped socket of the lever, whereby on rotation of the shaft, the lever will be raised to re-engage the latch and once again hold the slam-shut valve in the open position. The reset assembly is used subsequent to the overpressure condition being corrected. A further safeguard is embodied in the reset assembly by use of an equalizing valve interconnecting the lever and valve element, and being automatically operated to equalize the pressure upon the initial movement of the reset shaft during the resetting operation.

1 Claim, 9 Drawing Figures

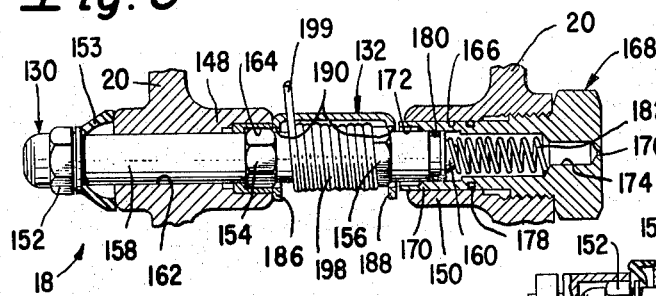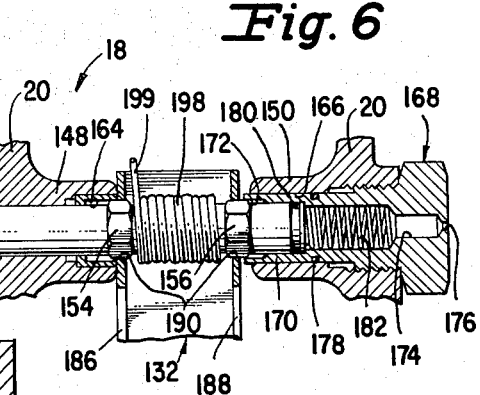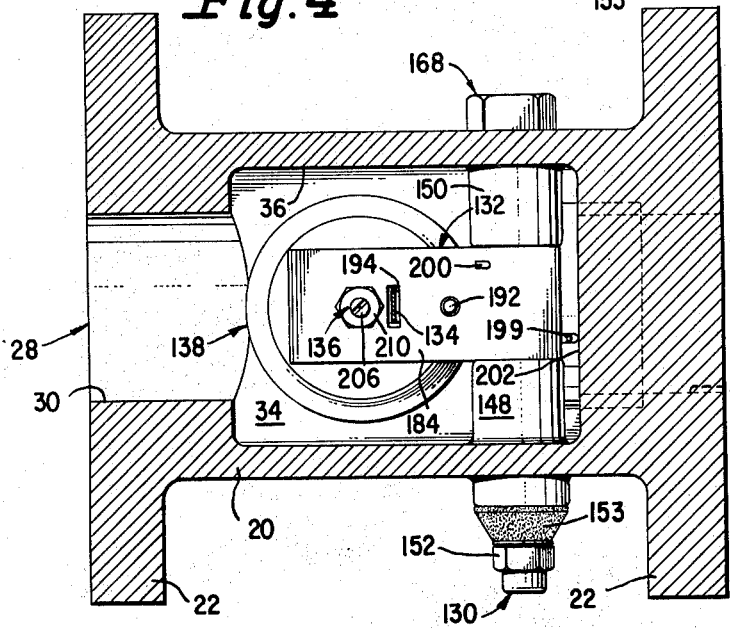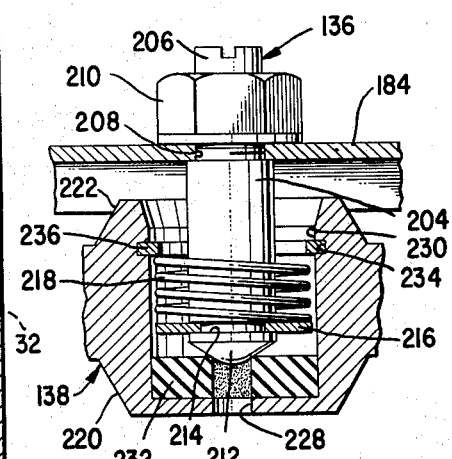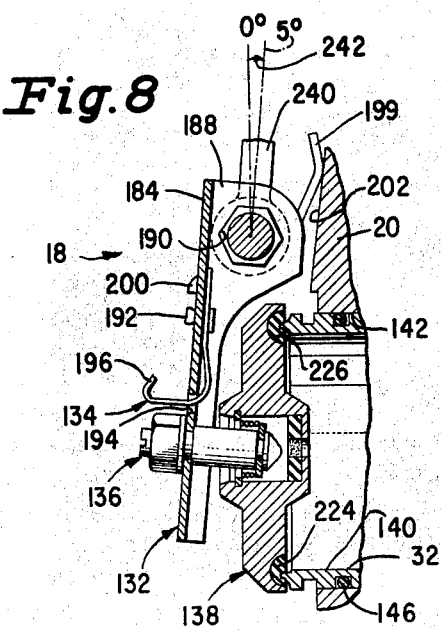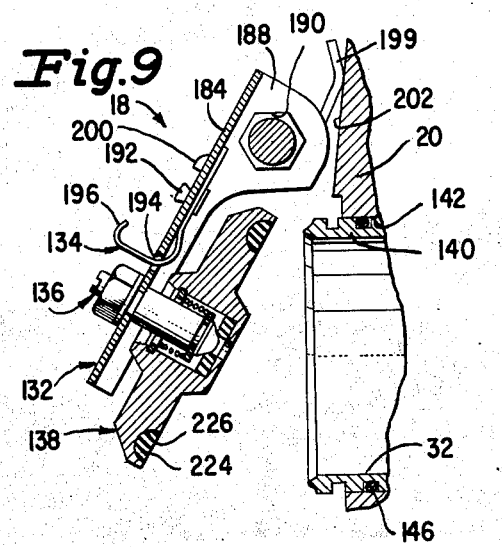

4,067,359

RESET ASSEMBLY FOR SLAM-SHUT VALVES

BACKGROUND OF THE INVENTION

Heretofore, in the prior art, various types of slam-shut valves have used different latch mechanisms with different kinds of reset assemblies. If a lever carried the valve element and was pivotally mounted on a transversed shaft, it would be affixed thereto so that simple rotation of the shaft would raise the lever and valve elements to a re-latching position. This had the dual disadvantage of excessive wear of the components and difficulty of assembly of the reset assembly within the housing. Also, to be considered, is the lack of safety feature in that rotation of the shaft may be required for closing, or after closing might result in accidental resetting of the slam-shut valve.

Also, if an equalizing valve was present, it was always separate from the reset mechanism and individually operated.

SUMMARY OF THE INVENTION

It is therefore an object of the present invention to provide an improved reset assembly for a slam-shut valve which overcomes the prior art disadvantages; which is simple, economical and reliable; which requires a two-step resetting operation, namely pushing the reset shaft inwardly to connect with the lever and subsequently rotating the shaft and now captive lever to the latched, open position; which includes an equalizer valve in the reset assembly; which includes an equalizer valve automatically operative upon initial rotation of the reset lever during the reset operation; which mounts the lever upon the shaft between two bosses in the valve housing to permit rotation of the lever, but to prevent transverse movement thereof; which permits free rotation of the reset shaft without the resetting of the lever; and which spring-biases the lever in the extended non-operative position whereby rotation thereof will not produce resetting of the lever.

Other objects and advantages will be apparent from the following description of one embodiment of the invention, and the novel features will be particularly pointed out hereinafter in the claims.

BRIEF DESCRIPTION OF THE DRAWINGS

This invention is illustrated in the accompanying drawings in which:

FIG. 4 is a top plan view, taken along line 4—4 of FIG. 2.

FIG. 5 is a front elevational view taken along line 5—5 of FIG. 2.

FIG. 6 is a front elevational view, partly in section, of the reset shaft in the depressed operative reset position.

FIG. 7 is an enlarged view of the equalizing valve of the present invention.

FIG. 8 is a side elevational view showing the reset assembly with the equalizing valve operative upon the initial rotation of the reset shaft and valve lever.

FIG. 9 is a side elevational view, partly in section, of the reset assembly with the slam-shut valve element removed from the valve seat and being rotated towards the reset open position.

DESCRIPTION OF THE INVENTION

Figure 1:
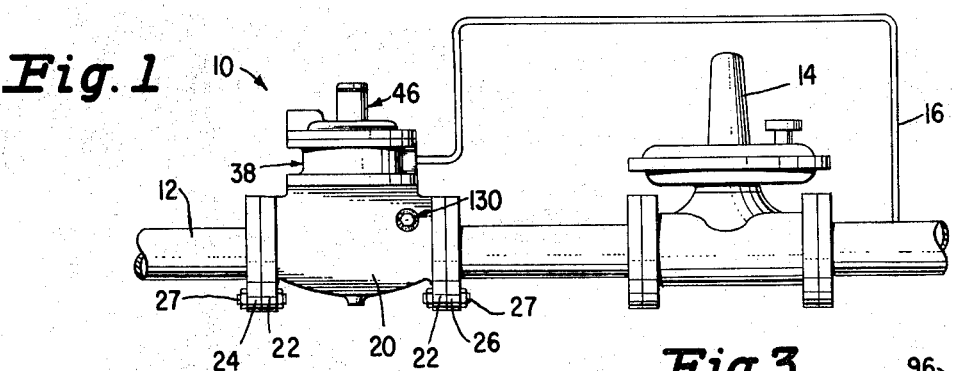
FIG. 1 is a side elevational view showing a typical installation with the slam-shut valve connected in a pipeline upstream of and in series with a pressure regulator.

The slam-shut valve, designated generally as 10, of the present invention is illustrated in FIG. 1 as being embodied in a gas pipeline or system 12, upstream of a pressure regulator 14. A pressure sensing line 16 is connected to communicate the pressure in the pipeline 12 downstream of the pressure regulator 14 to the slam-shut valve 10. When the pressure communicated by line 16 to the slam-shut valve 10 increased above a preset "trip" pressure, the slam-shut valve 10 will automatically trip, as more fully described hereinafter, to close the valve 10 and prevent any further flow to the downstream side thereof and of pipeline 12. Once the cause of the overpressure condition has been corrected, the slam-shut valve 10 can be manually reset to reinstate the flow in pipeline 12 by use of an improved reset assembly, designated generally 18, and shown in FIGS. 2, 4 and 5, of the present invention.

The slam-shut valve 10 has a housing 20 formed with annular radial flanges 22, 22 at either axial end thereof which serve to connect the slam-shut valve 10 to corresponding flanges 24 and 26 of the pipeline 12 by studs 27, shown only in FIG. 1.

Figure 2:
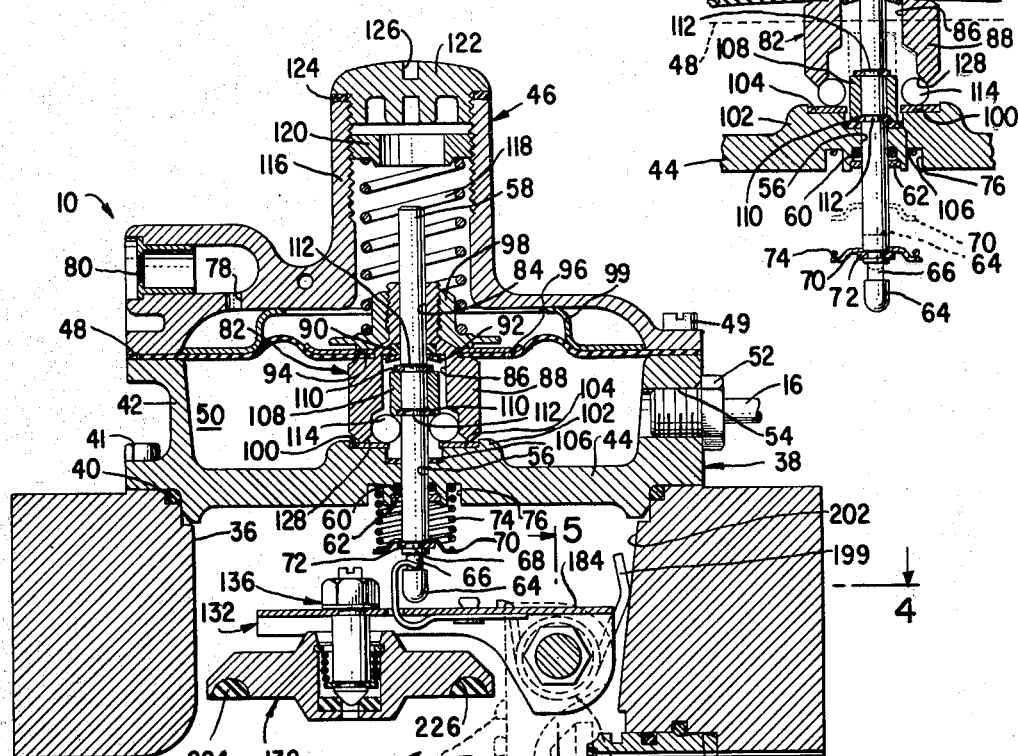
FIG. 2 is a sectional side elevational view of the slam-shut valve of the present invention.

The housing 20 illustrated in FIGS. 2 and 4, includes a central flow passage 28 extending substantially axially for alignment with corresponding flow passages in the pipeline 12. Flow passage 28 has an inlet portion 30 and an outlet portion 32, each of which, communicate with a central valve chamber 34 therein. The chamber 34 extends upwardly from the flow passage 28, and terminates in an open top 36 of the housing 20, which is enclosed by a diaphragm housing 38 with the connection therebetween sealed by an O-ring 40. The diaphragm housing 38 is connected to the housing 20 by bolts 41 only one of which is shown in FIG. 2.

The diaphragm housing 38 has a bowl-shaped lower portion 42, the bottom wall 44 of which carries the O-ring 40 and nests upon the housing 20 to close the top opening 36 of the chamber 34. A top portion 46 of housing 38 sandwiches the peripheral edge of a diaphragm 48 between itself and the lower portion 42 to which it is sealingly connected by screws 49 shown only in FIG. 2. A pressure chamber 50 is formed in the interior of the lower portion 42 below the diaphragm 48. The sensing line 16 communicates with pressure chamber 50 and carries a fitting 52 at the valve end thereof, which is threadedly received in an aperture 54 formed in the side wall of the lower portion 42. The bottom wall 44 has a bore 56 therein through which a release shaft 58 extends. An O-ring 60 provides a seal about the underside of the bottom wall 44 at the point the shaft 58 egresses, and the O-ring is retained in position by a retainer ring 62.

The lower end 64 of the shaft 58 is round and smooth with an annular groove 66 spaced from and adjacent to the end 64. A narrow recess 68 is formed above the groove 66. A spring holder 70 is mounted at the recess 68 by a retainer 72 disposed in the recess 68 and carries the lower end of a release spring 74, the upper end of which, is disposed in an annular recess 76 which is formed in the bottom wall 44 outwardly of and spaced from the O-ring 60. The spring 74 urges the release shaft 58 in the downward direction as viewed in FIG. 2.

The pressure chamber 50 is exposed to the pressure in the pipeline 12 on the downstream side of pressure regulator 14 via the sensing line 16. The upper side of the diaphragm 48 is vented to the atmosphere through a passageway 78 and a vent screen 80.

A holding mechanism includes a ball cage 82 which essentially is cup-shaped. The cage 82 has a bore 84 through which the shaft 58 extends and a counterbore 86 which defines a skirt 88 and an annular shape between the shaft and the skirt 86. An O-ring 90 and retaining washer 92 are provided at the interface of the bores 84 and 86 to provide a seal with the periphery of the shaft 58. However, the shaft 58 and the ball cage 82 are independently movable with respect to each other.

The center of the diaphragm 48 illustrated in FIG. 2 is positioned upon an annular shoulder 94, and the diaphragm is retained by a diaphragm plate 96 and a diaphragm nut 98, threaded onto the reduced diameter upper end of the ball cage 82. An annular limiter plate 99 is disposed above the diaphragm 48 in spaced relation to plate 96 to limit the movement of the diaphragms 48 at its outer periphery remote from plate 96. The inner upper end of the limiter plate 99 contacts the upper portion 46 of housing 38 adjacent its central opening so as not to interfere with the free movement of the remainder of the diaphragm 48 and/or the release shaft 58. A stepped bore 100 is provided in a raised central portion 102 of the bottom wall 44, and a ball plate or washer 104 is positioned at the upper surface of the bore 100, while a resilient washer 106 of smaller diameter is positioned about the shaft 58 at the lower surface of the bore. A collar 108 is secured to the shaft 58 by a pair of retainer rings 110, 110 affixed in recesses 112, 112 formed in the shaft 58 on either side of the collar 108. A plurality of balls 114 are positioned about the periphery of the shaft 58 in the annular space defined by the shaft 58 and the skirt 88 of the ball cage 82. The balls 114 are radially restrained as illustrated in FIG. 2, by the ball cage 82 so as to contact the underside of the collar 108 affixed to the release shaft 58. This serves to hold the release shaft 58 in a holding or upper position in which it remains locked or cocked prior to its release.

The upper portion 46 of the diaphragm housing 38 shown in FIG. 2 includes a dome 116 for housing a pressure spring 118, the lower end of which is disposed about the diaphragm nut 98 to provide a predetermined bias on the diaphragm 48. The force of the spring 118 against the diaphragm 48 may be adjusted by varying the position of a threaded spring seat member 120, which is threadedly engaged in the internally threaded upper portion of the dome 116. Access to the seat member 120 and spring 118 is gained by removing a plug 122 which is threadedly engaged to the dome 116 above the spring member 120 to close the open upper end thereof. A gasket 124 is disposed between the plug 122 and the dome 116 to seal the connection therebetween.

The spring 118, or adjustment thereof, determines the pressure required on the underside of the diaphragm 48 to trigger or release the holding mechanisms of the release shaft 58. A slot 126 is provided in the plug 122 for receiving the end of a suitable tool, such as a screwdriver or the like, for facilitating the rotation of the plug 122 for its connection to or removal from the dome 116.

Figure 3:
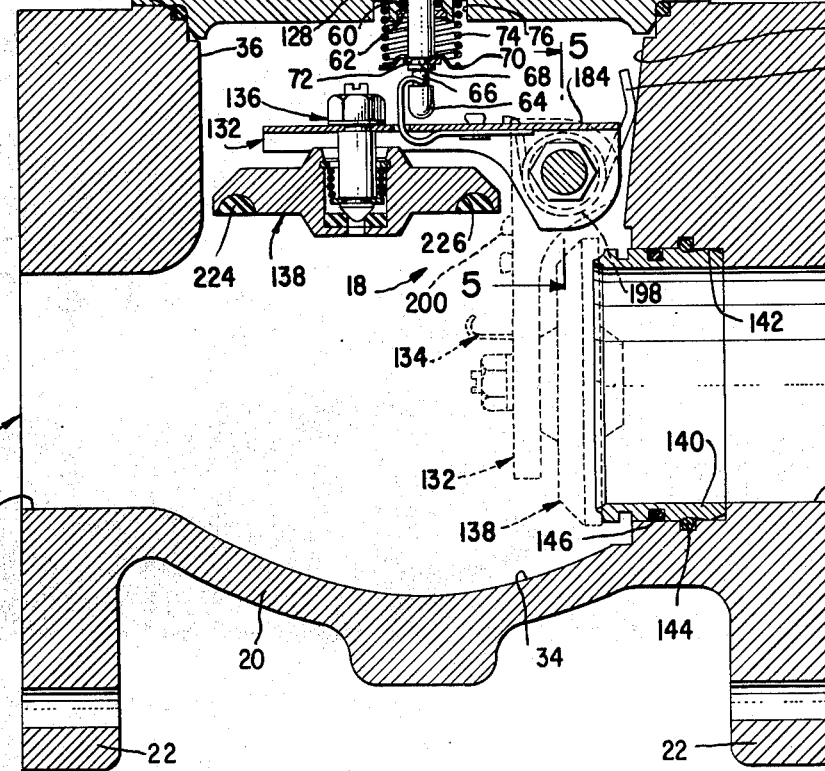
FIG. 3 is a sectional side elevational view showing release of the shaft of the holder mechanism.

In the event that a predetermined overpressure condition is communicated via sensing line 16 to the pressure chamber 50, the diaphragm 48 will rise from the dotted line to the solid line position as illustrated in FIG. 3 due to the increased pressure, thereby causing the ball cage 82 to also rise. This action frees the ball 114 and allows them to move radially outwardly of the shaft 58, under pressure from the spring 74 transmitted through the collar 108, thereby releasing the collar 108 and allowing the shaft 58 to drop vertically downwardly to the tripped or released lower position depicted in FIG. 3 for purposes more fully described hereinafter. In order to accomplish the releasing action, the balls 114 move along the inclined face 128 of the inner edge of the skirt 88 of the cage 82. When the holding mechanism is tripped, subsequent correction of the overpressure condition will not automatically cause the release shaft 58 to be raised or cocked, but this will be done through the operation of the reset assembly 18, as described hereinafter.

The reset assembly 18 illustrated in FIGS. 2, 4 and 5, is composed of various subassemblies which include such components as a reset shaft 130, which pivotally carries a lever 132 to which is affixed a latch member 134 releasably held within the groove 66 of the release shaft 58. Also, included is an equalizing valve 136 which interconnects the lever 132 and a valve element or seat disc 138 designed to coact with a valve seat or seat ring 140, affixed in a milled bore 142 of the outlet 32 by a retaining ring 144, in sealed relationship by an O-ring 146 disposed in the seat ring 140 in engagement with the milled bore 142.

The reset shaft 130 is mounted in a pair of bosses 148 and 150 formed on opposite sides of the upper portion of the central chamber 34 at a location above and transverse to the central flow passage 28. A cage nut 152 is affixed to the reset shaft 130 at the external end thereof adjacent to boss 148. A dust cover 153 made of resilient material is disposed upon the shaft 130 between the nut 152 and the housing 20. A pair of intermediate bolt heads 154 and 156 are formed at predetermined distances along the shank 158 of the reset shaft 130. The inner end 160 is tapered and of reduced diameter. Boss 148 has a bore 162 to receive the shank 158 and is counterbored and receives an insert at 164 so as to receive the bolt head 154. The boss 150 has a bore 166 threaded at its outer end and of larger diameter than the bore 162, so as to threadedly receive a nut 168 shown in FIGS. 4 and 5, the inner end of which, is a hollow sleeve 170 which rotatively receives the lower end of the shank 158 and the inner end 160 of the reset shaft 130.

A counterbore 172 is formed in the sleeve 170 at the innermost end thereof with a diameter sufficiently large to rotatably receive the bolt head 156 therein. A necked-down portion 174 is formed at the opposite end of the interior of the sleeve 170 adjacent the exterior portion of the nut 168 which terminates in a bleed passage 176 in communication with the atmosphere. To seal the interior of the housing 20 at the nut 168 from the atmosphere, a pair of O-rings 178 and 180 are disposed at the interior and exterior periphery of the sleeve 170, as illustrated in FIGS. 5 and 6. A spring 182 is engaged between the necked-down portion 174 and the tapered inner end 160 of the shaft 130 to urge the shaft 130 in the leftward direction as viewed in FIG. 5.

The lever 132 illustrated in FIGS. 2, 4 and 5, has a flat body portion 184 with a downturned side flanges 186 and 188 which are narrow at the forward end and ear-shaped at the end adjacent the reset shaft 130. A hexagon socket 190, sized to operatively receive the bolt heads 154 and 156 respectively, is formed in the ear of each of the flanges 186 and 188 and permits the shank 158 of the shaft 130 to normally pass therethrough as best seen in FIG. 5. A latch 134 is riveted as at 192 to the underside of the body 184 of the lever 132, and extends therefrom through a slot 194 in a vertical direction to terminate in a bent finger 196 which engages the flat lower surface of the groove 66 formed adjacent to and above the end 64 of the release shaft 58 as shown in FIG. 2, normally to hold the lever 132 in a raised substantially horizontal position.

A closing spring 198 is disposed about the shank 158 intermediate the bolt heads 154 and 156 of the reset shaft 130, and is confined between the pair of ears of the flanges 186 and 188 with one end 200 thereof extending through an aperture of the body 184 to hook the spring 198 to the lever 132, while the other end 199 thereof pushes against an end wall 202 formed in the upper portion of the chamber 34 above the seat ring 140, as shown in FIGS. 2 and 4. The spring 198 is coiled about the shaft 130 and is biased to urge the lever to pivot counterclockwise about the shaft as viewed in FIG. 2 which movement is normally prevented by the latch 134 engaging the release shaft 58.

An equalizer valve 136 is integrally mounted in the valve element or seat disc 138, and interconnects the same to the free end of the lever 132. The equalizing valve 136 has a body portion 204, the upper end of which, forms a shoulder screw 206 of reduced diameter which passes through an aperture 208 of the body 184 of the lever 132 to receive a fastening nut 210 which affixes the body 204 to the lever 132. A valve element 212 is formed at the lower tapered end of the body 204, and upwardly thereof is an annular groove 214 which receives a retaining plate 216 to hold one end of a coil spring 218 which is disposed about the body 204.

The valve element 138 is disc-shaped with central projections 220 extending from the underside thereof, and 222 extending from the upper surface thereof, respectively. A closure ring 224 made of suitable resilient material is affixed within a circular recess 226 formed on the underside and adjacent the edge of the valve element 138. The closure ring 224 will coact as illustrated in FIG. 8, with the seat ring 140, so that on operation of the slam-shut valve 10, the outlet 32 will be completely closed to prevent the flow of any gas therethrough as is represented by the dotted line showing of the valve element 138, in FIG. 2, disposed in engagement with the seat ring 140.

The valve element 138 has a relief passage 228 formed centrally of the lower projection 220 which extends from the underside of the element 138 upwardly into an enlarged counterbore 230. A resilient annular valve seat 232 is affixed to the bottom of the counter-bore 230 with the central opening thereof aligned with and coextensive to the relief passage 228. A radial groove 234 is formed a short distance from the top of the counterbore 230 and subsequent to the body 204 and spring 218 of the equalizing valve 136 being disposed in the counterbore 230, a retaining ring 236 is connected in the groove 234 to entrap the spring 218, and also, that portion of the body 204 held by said spring. The spring 218 will be slightly compressed to urge the equalizing valve 136 to remain in the closed position wherein the valve element 212 thereof is sealed against the valve seat 232, as best shown in FIG. 7.

The slam-shut valve 10 is a two-position valve, open as shown in the solid line drawing of FIG. 2, wherein the lever 132 is in the raised latched position, and closed wherein the lever 132 has been released and forced by the closing spring 198 to rotate counterclockwise to cause the valve element 138 to seat upon the seat ring 140 and close the outlet passage 32, as shown in the dotted line representation of FIG. 2. Release of the latch 134 is accomplished due to an overpressure condition developing in chamber 50 to cause the diaphragm 48 to be raised from the position shown in FIG. 2 or the dotted line representation shown in FIG. 3 to the vertically raised solid line position shown in FIG. 3, wherein the ball cage 82 is vertically raised sufficiently to release the ball 114 in a radial direction so as also to release the collar 108 and permit the shaft to drop vertically downwardly under the force of the spring 74 to thus cause the bent finger 196 of the latch 134 to slip from its engagement in the groove 66 and free the lever 132.

When the cause of the overpressure condition has been corrected, it becomes necessary to reset the slam-shut valve 10. This is accomplished in the practice of the present invention by following the steps outlined and illustrated in FIGS. 6, 8 and 9. A suitable tool such as a socket wrench 240 illustrated in FIGS. 6 and 8, engages the cage nut 152 and the reset shaft 130 is pushed inwardly against the spring 182 to engage the hexagon bolt head 154 and 156 with the hexagon sockets 190, 190 in the flanges 186 and 188 respectively, of the lever 132, as illustrated in FIG. 6. While holding the reset shaft 130 in the depressed position, the wrench 240 will be turned to rotate the shaft in the clockwise direction as viewed in FIG. 8. Within the initial 5° of rotation as indicated by the reference character 242 illustrated in FIG. 8, the lever 132 will be moved sufficiently to cause the body 104 to shift, and the valve element 212 to be unseated from the valve seat 232 and substantially collapse the spring 218 to permit pressure from the chamber 34 to escape through the relief passage 228 via outlet passage 32 downstream of the slam-shut valve 10, so as to substantially equalize the pressure on either side of the valve element 138, or at least render the differential pressure sufficiently low to permit easy resetting of the slam-shut valve 10. The pressure relief is accomplished as depicted in FIG. 8, while the valve element 138 remains engaged and closed upon the seat ring 140. Continued rotation of the reset shaft 130 in the clockwise direction raises the valve element 138 from the seat ring 140 and will restore the equalizing valve 136 to the closed position under the force of spring 218. Thereafter, the reset shaft 130 will be continually rotated until the reset position shown in FIG. 2 is restored.

The improved reset shaft 130 permits a positive two-step reset operation wherein simply rotating the reset shaft 130 will not cause the lever 132 to be raised as the hexagon bolt head 154 and 156 are out of engagement with the hexagon sockets 190, 190 of the lever 132. The extra step is an additional safety feature so as to prevent accidental resetting of the slam-shut valve 10 prior to correction of the overpressure condition. Upon release of the depressed reset shaft 130, the spring 182 will urge it to its extended position and disengage the hexagon bolt heads 154 and 156 from operative engagement with the lever 132. By incorporating the equalizing valve 136 in the reset assembly 18, it is possible after depressing the reset shaft 130, and with a single motion of the lever 132, to accomplish the dual operation of equalizing the pressure differential across the valve element 138 to permit unseating the same, and also, to reset the assembly 18 in the raised latched position.

It will be understood that various changes in the details, material, arrangements of parts and operating conditions which have been herein described and illustrated in order to explain the nature of the invention, may be made by those skilled in the art within the principles and scope of the invention.

Having thus set forth the nature of the invention, what is claimed herein is:

1. A reset assembly for a slam-shut valve having a diaphragm actuated release shaft releasable upon the diaphragm sensing an overpressure condition, the release shaft journaled in a diaphragm housing mounted upon a valve housing in a chamber formed therein above a flow passage, the reset assembly comprising:
   a. a reset shaft rotatably mounted in the chamber with an externally extending bolt head, and an internally formed bolt head,
   b. a lever journaled on the shaft having a socket means therein adapted to receive the internal bolt head,
   c. a latch carried by the lever normally to engage the release shaft to hold the lever in raised position, and to be disengaged from the release shaft upon actuation thereof to release the lever,
   d. a slam-shut valve element responsive upon release of the lever to close the flow passage,
   e. the slam-shut valve element having a counterbored central aperture,
   f. an equalizer valve having a cylindrical body portion having one end rigidly connected to the lever and having the other free end portion configured as a valve head seating surface and extending into the aperture of the slam-shut valve element with substantial clearance formed between the side walls of the counterbored aperture and the body portion adapted to permit relative universal motion of the equalizer valve or the slam-shut valve element,
   g. a coil spring disposed about the body portion within the said clearance with one end thereof connected to the body portion and the other end thereof connected to the valve element normally to urge the free end of the body portion to close the aperture of the valve element and to permit the slam-shut valve element to be self-aligning on closure thereof,
   h. the body portion to transcribe an arcuate motion within the said clearance to open the aperture to equalize the pressure across the slam-shut valve element, and upon collapse of the spring the slam-shut valve element to be moved away from the flow passage,
   i. a pair of retaining members, one connected adjacent the larger opening of the said counterbore and the other connected adjacent the seating surface end of the body portion, and; the spring is entrapped between the retaining members.

* * * * *